(12) United States Patent
Sakamoto et al.

(10) Patent No.: US 10,828,773 B2
(45) Date of Patent: Nov. 10, 2020

(54) VOICE INTERACTIVE ROBOT AND VOICE INTERACTION SYSTEM

(71) Applicant: TOYOTA JIDOSHA KABUSHIKI KAISHA, Toyota-shi, Aichi-ken (JP)

(72) Inventors: Hayato Sakamoto, Kawasaki (JP); Atsushi Ikeno, Kyoto (JP); Masaaki Hanada, Tokyo (JP); Takehiko Ishiguro, Tokyo (JP); Masayuki Taniyama, Tokyo (JP); Toshifumi Nishijima, Kasugai (JP); Hiromi Tonegawa, Okazaki (JP); Norihide Umeyama, Nisshin (JP); Satoru Sasaki, Jotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 274 days.

(21) Appl. No.: 15/958,602

(22) Filed: Apr. 20, 2018

(65) Prior Publication Data

US 2018/0311816 A1    Nov. 1, 2018

(30) Foreign Application Priority Data

Apr. 27, 2017    (JP) ................... 2017-088656

(51) Int. Cl.
*B25J 9/16* (2006.01)
*G06F 3/16* (2006.01)
(Continued)

(52) U.S. Cl.
CPC .......... *B25J 9/1602* (2013.01); *B25J 9/1697* (2013.01); *G06F 3/167* (2013.01); *G10L 15/22* (2013.01);
(Continued)

(58) Field of Classification Search
CPC ... B25J 9/16; B25J 9/1602; B25J 9/161; B25J 9/1689; B25J 9/1697; B25J 11/0005;
(Continued)

(56) References Cited

U.S. PATENT DOCUMENTS 4,697,979 A * 10/1987 Nakashima .............. B25J 19/06
180/2.1
2004/0015265 A1    1/2004 Asano et al.
(Continued)

FOREIGN PATENT DOCUMENTS

JP    2003-266351 A    9/2003
JP    2008-087140 A    4/2008
(Continued)

*Primary Examiner* — Robert T Nguyen
(74) *Attorney, Agent, or Firm* — Oliff PLC

(57) ABSTRACT

A voice interactive robot interacting with a user by voice includes a main body, a movable part capable of moving relative to the main body, a following control unit that moves the movable part so that the movable part follows the user, a temporary origin setting unit that sets a temporary origin of the movable part in response to movement of the movable part by the following control unit, an acquisition unit that acquires an operation instruction issued in relation to the movable part, and an operation execution unit that moves the movable part in accordance with the operation instruction using the temporary origin as a reference.

9 Claims, 9 Drawing Sheets

(51) Int. Cl.
*G10L 15/22* (2006.01)
*G10L 15/30* (2013.01)

(52) U.S. Cl.
CPC ........ *G10L 15/30* (2013.01); *G10L 2015/223* (2013.01); *G10L 2015/228* (2013.01)

(58) Field of Classification Search
CPC ........ B25J 19/00; G06F 3/167; G10L 15/005; G10L 15/22; G10L 15/30; G10L 2015/223; G10L 2015/228
See application file for complete search history.

(56) References Cited

U.S. PATENT DOCUMENTS

| | | | |
|---|---|---|---|
| 2009/0287354 A1* | 11/2009 | Choi | B25J 9/1682 700/261 |
| 2011/0082586 A1* | 4/2011 | Nishihara | B25J 9/1697 700/259 |
| 2015/0158181 A1* | 6/2015 | Kawamura | B25J 9/1697 700/259 |
| 2016/0279800 A1* | 9/2016 | Onda | B25J 9/1697 |
| 2017/0341233 A1* | 11/2017 | Keller | B25J 9/1676 |
| 2017/0348858 A1* | 12/2017 | Chiu | G06F 3/014 |

FOREIGN PATENT DOCUMENTS

| | | | |
|---|---|---|---|
| JP | 2012-040655 A | | 3/2012 |
| JP | 2012040655 A | * | 3/2012 |
| JP | 2016-068197 A | | 5/2016 |

* cited by examiner

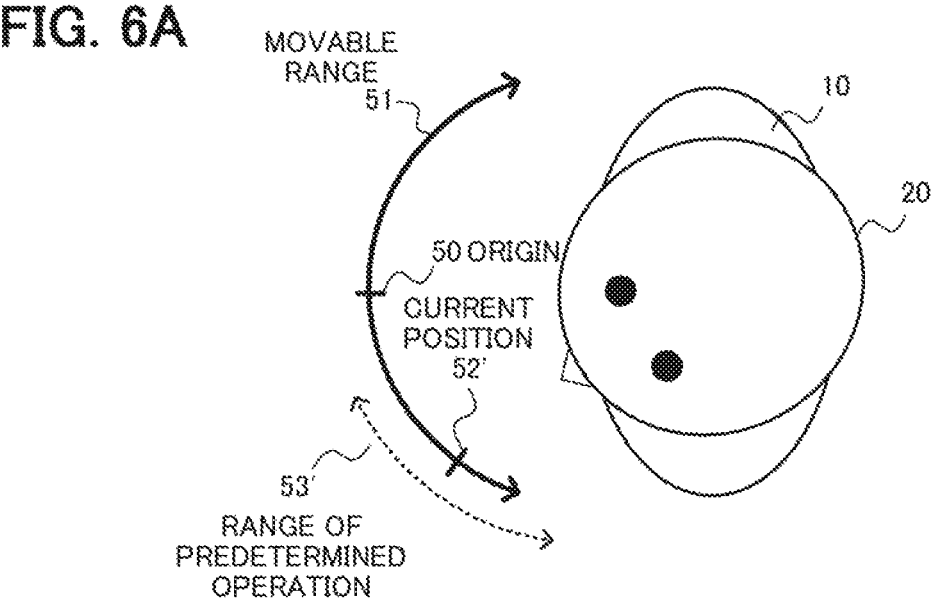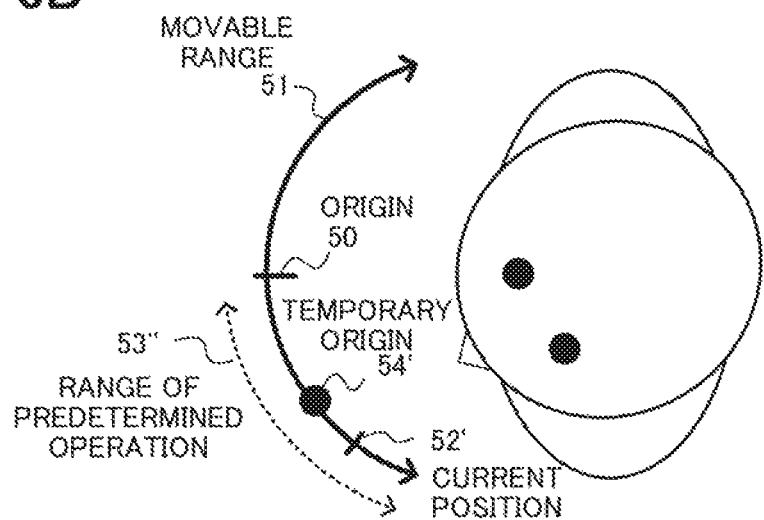

FIG. 9A  DIRECTLY OPPOSITE USER
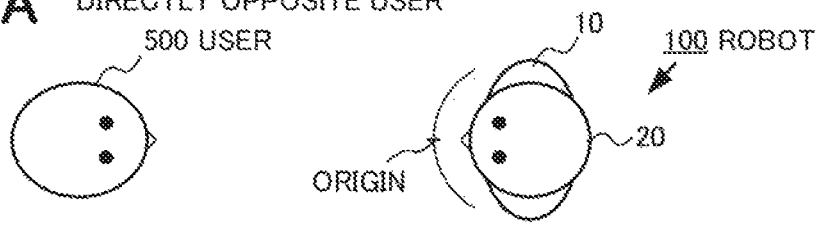
FIG. 9B  FOLLOW MOVEMENT OF USER
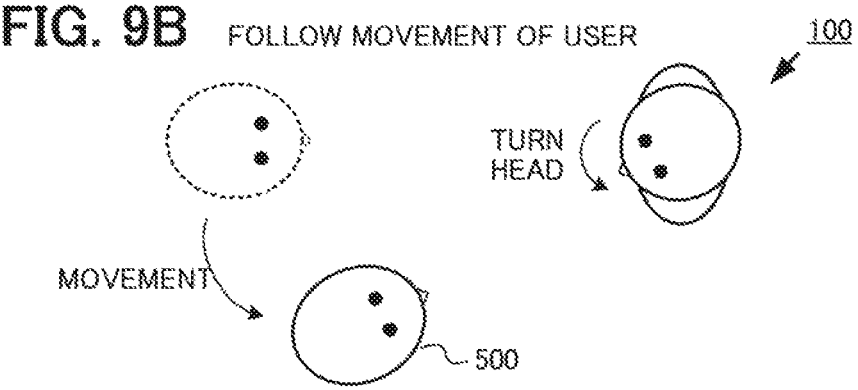
FIG. 9C  "CORRECT" OPERATION
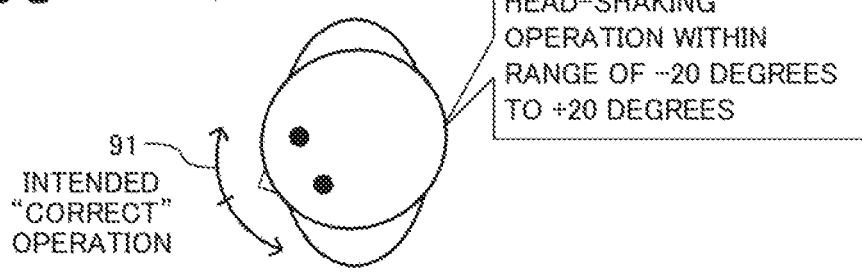
FIG. 9D  ACTUAL OPERATION (REFERENCE EXAMPLE)
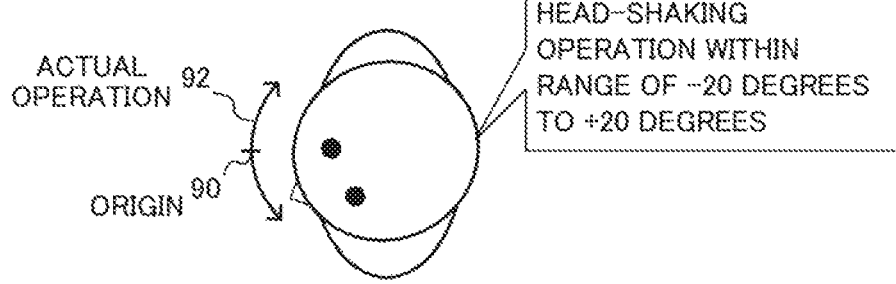

VOICE INTERACTIVE ROBOT AND VOICE INTERACTION SYSTEM

BACKGROUND OF THE INVENTION

Field of the Invention

The present invention relates to a voice interactive robot and a voice interaction system.

Description of the Related Art

A voice interaction system in which a voice interactive robot and a control computer such as a smartphone operate cooperatively with each other is in use. In this system, the voice interactive robot is used as an interface device for interfacing with a user, while voice recognition processing and response creation processing are executed by the smartphone or a server device requested by the smartphone to execute the processing. The smartphone then issues an utterance instruction to a robot terminal.

At this time, the robot terminal may be instructed to perform an operation corresponding to the content of the utterance. For example, the robot may be instructed to perform a greeting operation (an operation to nod the head up and down, for example) when caused by the smartphone to utter the word "Hello". The operation instruction may be specified according to a movement direction or distance on a coordinate system that uses a robot main body as a reference.

Further, a voice interactive robot that interacts with a user by voice may have a following function for orienting the face of the robot in the direction of the user. For example, a speaker following function for orienting the face in the direction of the voice of the user and a face following function for orienting the face of the robot in a direction in which the face of the user is detected on a captured image are known. (Japanese Patent Application Publication No. 2016-68197 and Japanese Patent Application Publication No. 2008-87140).

In a system where a voice interactive robot and a control computer such as a smartphone cooperate with each other, processing for following the user may be executed internally by the voice interactive robot, without using the smartphone.

SUMMARY OF THE INVENTION

When the voice interactive robot executes processing for following the user itself and does not notify the control computer of an operation condition, the control computer cannot ascertain the operation condition of the voice interactive robot. As a result, a problem occurs in that when the control computer issues an operation instruction using an initial position as a reference, the operation performed by the robot may deviate from the originally intended operation.

An object of the present invention is to enable a voice interactive robot that executes processing for moving a movable part in order to follow a user internally to execute an operation specified by an operation instruction appropriately even when the operation instruction is received from an external device that has not ascertained the operation condition of the movable part.

An aspect of the present invention is a voice interactive robot interacting with a user by voice, including:
a main body;
a movable part capable of moving relative to the main body;
a following control unit that moves the movable part so that the movable part follows the user;
a temporary origin setting unit that sets a temporary origin of the movable part in response to movement of movable part by the following control unit;
an acquisition unit that acquires an operation instruction issued in relation to the movable part; and
an operation execution unit that moves the movable part in accordance with the operation instruction using the temporary origin as a reference.

The movable part according to this aspect may be selected as desired, but in a case where the robot resembles a human or an animal, for example, the movable part may be at least one of a head, a hand, and a foot. There are no particular limitations on the operation performed by the movable part, and a rotary operation, a linear operation, or a combination thereof may be employed. Further, the degree of freedom of the operation performed by the movable part may be a single degree of freedom or multiple degrees of freedom.

According to this aspect, the movable part may be controlled by specifying a movement amount from an origin (a zero point) determined in advance. The origin is the origin of a motor when the movable part is in an initial position, for example. The operation execution unit according to this aspect may move the movable part by specifying a movement amount obtained by adding a difference between the origin and the temporary origin to the movement amount specified by the operation instruction.

Hence, according to this aspect, when the movable part is moved by the following control unit, the operation specified by the operation instruction is performed using the temporary origin as a reference. As a result, an appropriate operation can be performed even in response to an operation instruction issued without taking into account the condition of the movable part.

The following control unit according to this aspect may move the movable part so that the movable part is oriented in the direction of the user. For example, the movable part may be controlled so as to be oriented in a direction from which a user utterance (a voice) arrives, or so as to be oriented in a direction in which the face of the user is detected on a captured image. The temporary origin setting unit according to this aspect may set the position to which the movable part is moved by the following control unit as the temporary origin.

Here, when the position to which the movable part is moved by the following control is set as the temporary origin of the motor, a situation in which an operation based on the temporary origin exceeds a movable range of the movable part may occur.

To solve this problem, the position of the temporary origin is preferably adjusted so that an operation that may be specified by an operation instruction (an envisaged operation) remains within the movable range. A single temporary origin at which all envisaged operations remain within the movable range may be set in the robot. Alternatively, a temporary origin may be set for each envisaged operation so that each operation remains within the movable range.

Instead of setting the temporary origin after the movable part has been moved by the following processing control unit, the temporary origin may be set after acquiring the operation instruction. Here, the temporary origin setting unit sets the current position of the movable part (the position thereof after being moved by the following control unit) as the temporary origin in a case where the movable part does not exceed the movable range thereof when the operation specified by the operation instruction is executed using the current position as a reference. In a case where the movable part exceeds the movable range when the operation specified by the operation instruction is executed using the current position as a reference, on the other hand, the temporary origin setting unit sets the temporary origin such that the specified operation remains within the movable range.

Alternatively, the temporary origin may simply be set at the position to which the movable part is moved by the following control unit. The origin may then be modified temporarily in a case where the operation specified by the operation instruction actually exceeds the movable range when performed using the temporary origin as a reference. For example, a second origin with which the specified operation remains within the movable range may be set temporarily, and the specified operation may be performed using the second origin as a reference.

According to this aspect, the following control unit may be configured not to perform a following operation while the operation execution unit moves the movable part on the basis of the operation instruction. The reason for this is that when a following operation is performed, the specified operation cannot be performed appropriately.

A second aspect of the present invention is a voice interaction system constituted by the voice interactive robot described above and a control device. The control device is connected to the voice interactive robot by wireless communication, and includes an operation instruction transmission unit that transmits the operation instruction to the voice interactive robot. Here, the control device is a device that does not detect the operation condition (movement by the following control unit, for example) of the movable part of the voice interactive robot.

Note that the present invention may also be interpreted as a voice interactive robot or a voice interaction system that includes at least a part of the means described above. The present invention may also be interpreted as a control method for a voice interactive robot that executes at least a part of the processing described above. The present invention may also be interpreted as a computer program for causing a computer to execute this method, or a computer-readable storage medium that stores the computer program non-temporarily. The present invention may be configured by combining the respective means and processes described above wherever possible.

According to the present invention, a voice interactive robot that executes processing for moving a movable part in order to follow a user internally can execute an operation specified by an operation instruction appropriately even when the operation instruction is received from an external device that has not ascertained the operation condition of the movable part.

BRIEF DESCRIPTION OF THE DRAWINGS

FIGS. 6A and 6B are views illustrating the temporary origin setting processing;

FIGS. 9A to 9D are views illustrating a voice interactive robot that executes following processing internally, and a problem that occurs when the voice interactive robot receives an operation instruction from an external device that has not ascertained an operation condition of a movable part.

DESCRIPTION OF THE EMBODIMENTS

Preferred exemplary embodiments of the present invention will be described in detail below with reference to the figures.

Outline

Figure 1:
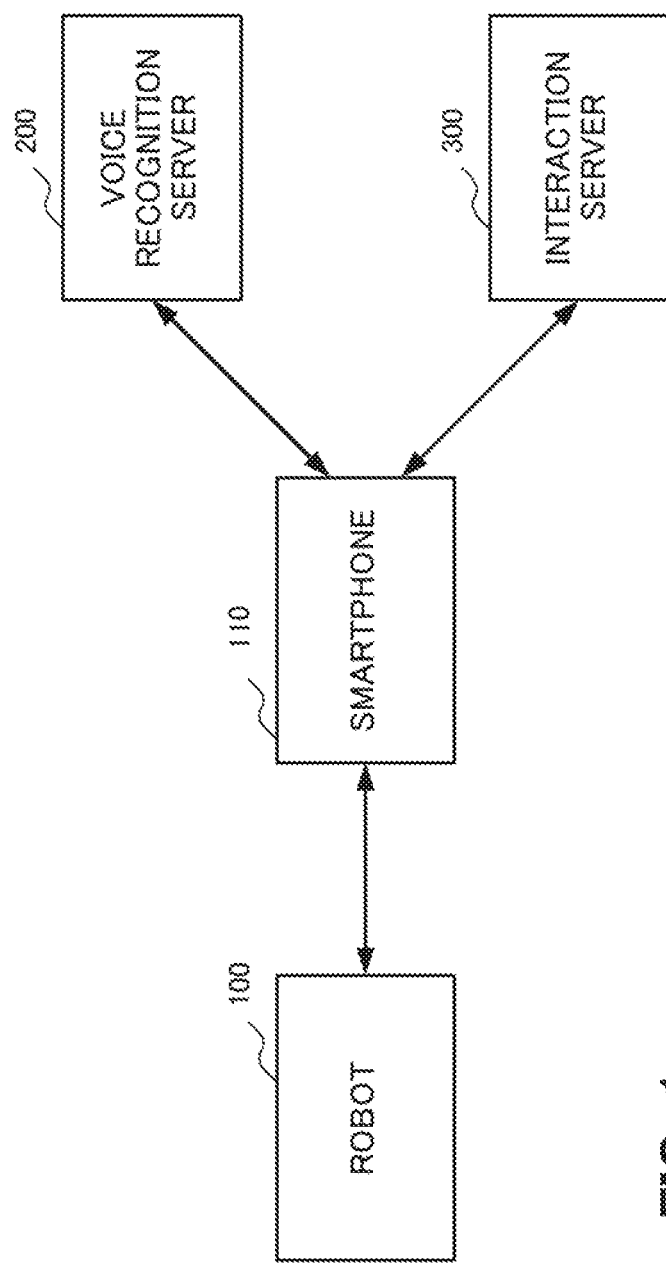
FIG. 1 is a view showing a system configuration of a voice interaction system according to an embodiment.

FIG. 1 is a view showing a system configuration of a voice interaction system according to this embodiment. As shown in FIG. 1, the voice interaction system according to this embodiment is constituted by a robot (a voice interactive robot) 100, a smartphone 110, a voice recognition server 200, and an interaction server 300, which are connected to each other by wireless communication. Communication between the robot 100 and the smartphone 110 can be realized by Bluetooth (registered trademark). Communication between the smartphone 110 and the voice recognition server 200 and interaction server 300 may be realized by portable telephone communication (LTE or the like), Wi-Fi, or wired communication.

In this embodiment, the robot 100 is used as a front end user interface device having a microphone and a speaker, and a voice of a user input into the robot 100 is transmitted to the smartphone 110. The smartphone 110 executes voice recognition processing using the voice recognition server 200, and generates an interaction statement (a response) using the interaction server 300. The smartphone 110 transmits voice data corresponding to the interaction statement, which are generated by voice synthesis processing, to the robot 100, and the robot 100 reproduces the received voice data through the speaker. By executing this processing repeatedly, a dialog between the user and the voice interaction system progresses. A voice interaction system in which this processing is decentralized is well-known, and therefore detailed description of respective configurations thereof and processing executed thereby has been omitted.

Figure 2A:
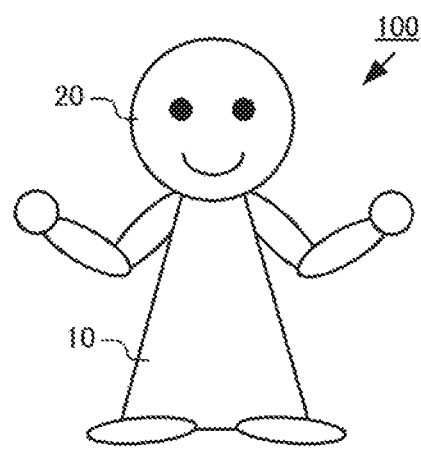
FIGS. 2A to 2D are views showing an outer appearance of a voice interactive robot.
Figure 2B:
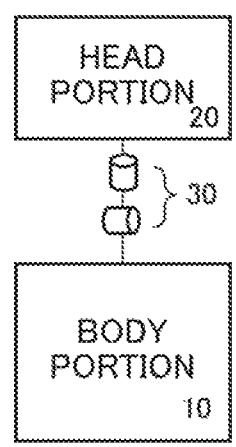
Figure 2C:
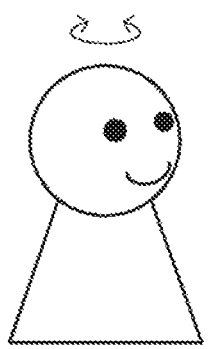
Figure 2D:
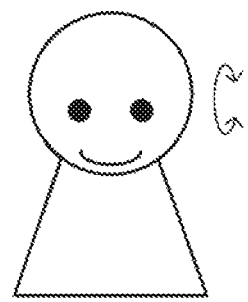

FIG. 2A shows the outer appearance of the robot 100 schematically. The robot 100 includes a body (a main body) 10 and a head portion 20. As shown in FIG. 2B, the head portion 20 is configured to be rotatable relative to the body 10 using a motor 30. In this embodiment, the head portion 20 is connected to the body 10 by a two degree-of-freedom joint so as to be capable of rotating (rolling and pitching) as shown in FIGS. 2C and 2D. A servo motor is used as the motor 30 in order to drive the joint and acquire the condition of the joint.

The robot 100 may be configured to have movable hands, feet, and so on as well as the movable head portion 20, but in this embodiment, a case in which only the head portion 20 is movable will be described.

In principle, voice output processing and attitude control processing (head portion movement control processing) by the robot 100 according to this embodiment are executed in response to instructions from the smartphone 110. However, the robot 100 implements following processing for orienting the head portion in the direction of a user with whom a dialog is underway internally and autonomously. It is assumed here that the smartphone 110 is not notified of the position and condition of the head portion 20 resulting from the following processing. The smartphone 110 is therefore unable to ascertain the attitude of the head portion 20 resulting from the following processing, and as a result, the attitude of the robot 100 may not be operated appropriately in response to an attitude control command issued to the robot 100 from the smartphone 110.

In this embodiment, an operation instruction issued to the robot 100 from the smartphone 110 uses a coordinate origin of the robot 100 as a reference. Therefore, when the head portion 20 of the robot 100 is oriented in a different orientation to an initial position as a result of the following function, the head portion 20 does not move as intended by the operation instruction from the smartphone 110. For example, even if an operation instruction is issued with the intention of realizing a head-shaking operation centering on the current orientation of the head portion, the head-shaking operation is performed as an operation centering on the initial position, and therefore, when the head portion has been moved to a different position to the initial position in accordance with the following processing, the head-shaking operation is not performed from that location.

FIG. 9A shows a condition in which the robot 100 and a user 500 directly oppose each other. As shown in FIG. 9B, when the user 500 moves, the robot 100 changes the orientation of the head portion by means of following processing so that the head portion (the face) directly opposes the user 500. When an operation instruction for performing a head-shaking operation of ±20 degrees is received from the smartphone 110 in this condition, although a head-shaking operation 91 performed from the current condition, as shown in FIG. 9C, would be actually appropriate, a head-shaking operation 92 is performed inappropriately using an origin 90 as a reference, as shown in FIG. 9D.

Configuration

In this embodiment, to solve the problem described above, the robot 100 is provided with the following functions.

Figure 3:
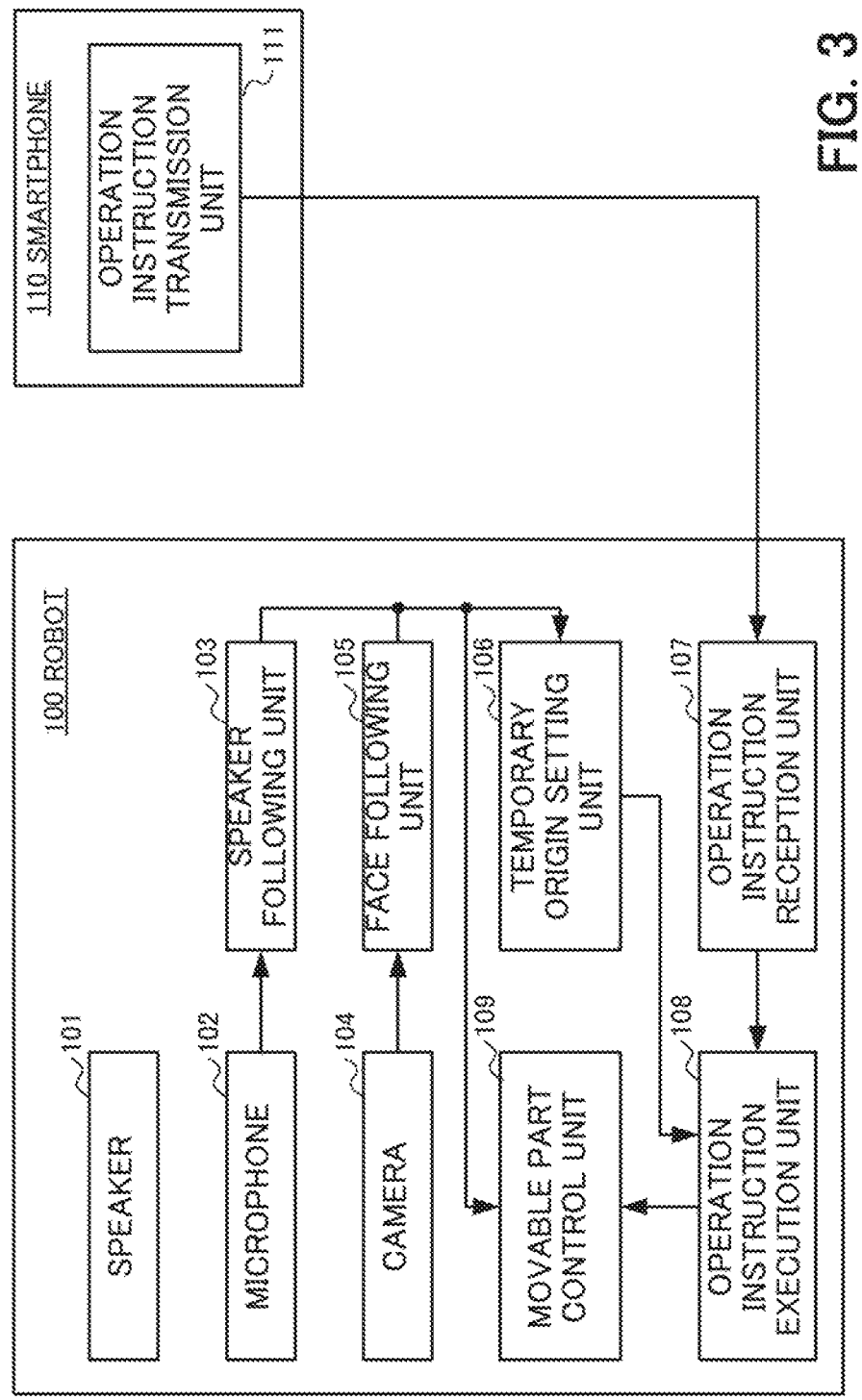
FIG. 3 is a view showing a functional configuration of the voice interactive robot according to this embodiment.

FIG. 3 shows functional units relating mainly to operations of the movable part (the head portion 20) of the robot 100. As shown in FIG. 3, the robot 100 includes a speaker 101, a microphone 102, a speaker following unit 103, a camera 104, a face following unit 105, a temporary origin setting unit 106, an operation instruction reception unit 107, an operation instruction execution unit 108, and a movable part control unit 109. The robot 100 is a computer having a calculation device such as a microprocessor, a storage unit such as a memory, a communication device, and so on, and by having the calculation device execute a program, respective functions of the speaker following unit 103, the face following unit 105, the temporary origin setting unit 106, the operation instruction reception unit 107, the operation instruction execution unit 108, and the movable part control unit 109 are realized. All or a part or these functions may be realized by dedicated electrical circuits.

The speaker 101 outputs voice data received from the smartphone 110. The microphone 102 acquires voice utterances from a user. The microphone 102 A/D-converts analog voice data into digital data. The digital voice data are transmitted to the smartphone 110 by communication, and input into the speaker following unit 103.

The speaker following unit (following control unit) 103 specifies the direction of the speaker from the voice data input into the microphone 102. The speaker following unit 103 may determine the direction of a human voice to be the direction of the speaker, or may determine the direction of a voice having a specific voiceprint to be the direction of the speaker when an individual speaker can be specified. The speaker following unit 103 then instructs the movable part control unit 109 to orient the head portion 20 in the specified direction of the speaker.

The camera 104 captures images of the per of the robot 100. Image data captured by the camera 104 are transmitted to the smartphone 110 by communication, and input into the face following unit 105.

The face following unit (following control unit) 105 detects a face from the image data captured by the camera 104. The face following unit 105 may detect the face of the user using face detection technology for detecting a general face, or may detect the face of the user using face detection technology (face collation technology) for detecting a specific face when an individual speaker can be specified. The face following unit 105 converts the position of the face within the image into a relative position relative to the robot, and instructs the movable part control unit 109 to orient the head portion 20 in the corresponding direction.

The temporary origin setting unit 106 sets a temporary origin of the motor 30. An origin (also referred to as a zero point) is set in the motor 30 in advance, and the motor 30 is controlled using this origin as a reference. In this embodiment, two motors 30 are used to move the head portion 20, and therefore origins are set respectively for the two motors 30. The origin is a motor position in which the head portion 20 is located in an initial position relative to the body 10 (typically, a condition in which the head portion 20 is oriented straight forward). The temporary origin setting unit 106 sets a provisional origin (also referred to as a temporary origin) for each motor 30 when the orientation of the head portion 20 is modified by the speaker following unit 103 or the face following unit 105. The origin is not modified when a temporary origin is set in the motor 30.

The manner in which the temporary origin setting unit 106 sets the temporary origin will be described in detail below using flowcharts.

Note that when the speaker following unit 103 and the face following unit 105 both lose sight of the user, the temporary origin setting unit 106 either cancels the temporary origin setting or sets the origin as the temporary origin.

The operation instruction reception unit (acquisition unit) 107 receives an operation instruction from an operation instruction transmission unit 111 of the smartphone 110, and transmits the received operation instruction to the operation instruction execution unit 108. The operation instruction is an instruction such as "Orient the head portion 20 to a positron of 20 degrees in a horizontal direction" or "Cause the head portion 20 to perform a reciprocating motion within a range of −10 degrees to +10 degrees in the horizontal direction". Here, in this embodiment, instructions from the smartphone 110 are generally interpreted as being based on the origin of the motor. In other words, the former instruction is interpreted as an instruction to orient the head portion in a position of +20 degrees from the initial position, and the latter instruction is interpreted as an instruction to cause the head portion to perform a reciprocating motion within a range of −10 degrees from the initial position to +10 degrees from the initial position.

The operation instruction execution unit (operation execution unit) 108 converts the received operation instruction into an instruction based on the temporary origin in consideration of the received operation instruction and the temporary origin set by the temporary origin setting unit 106. More specifically, when the temporary origin is set, the operation instruction execution unit 108 determines a difference between the temporary origin and the origin as an offset, and instructs the movable part control unit 109 to move the head portion 20 to a position obtained by adding the offset to the position instructed by the operation instruction. The movable part control unit 109 drives the motor of the head portion 20 using the origin as a reference, and therefore the offset is added to ensure that the operation is performed using the temporary origin as a reference.

The movable part control unit 109 controls the motor 30 for driving the head portion 20. The movable part control unit 109 receives a motor control position as input, and drives the motor using the motor origin as a reference so that the motor moves to the control position. In other words, the movable part control unit 109 controls the head portion 20 upon reception of a specified movement amount from the motor origin.

The operation instruction transmission unit 111 of the smartphone 110 generates an operation instruction including an operation to be performed by the robot 100, and transmits the generated operation instruction to the operation instruction reception unit 107 of the robot 100 via a communication unit. For example, the smartphone 110 causes the robot 100 to perform an operation to nod the head up and down while uttering the word "Hello" by transmitting an operation instruction together with an interaction statement output instruction.

Processing

Processing executed by the robot 100 will now be described.

1. Following Processing and Temporary Origin Setting Processing

Figure 4A:
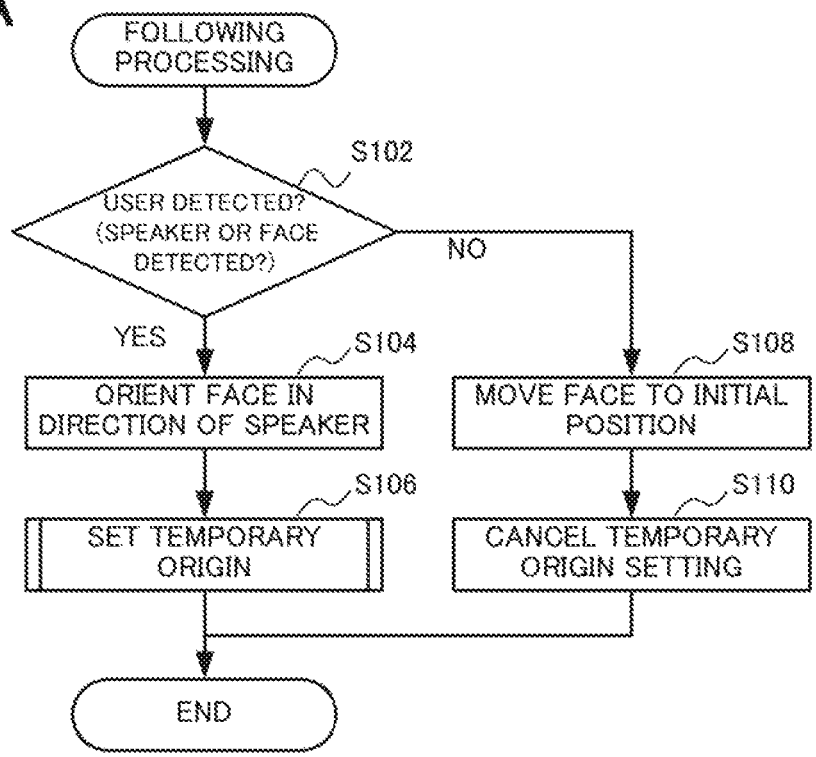
FIGS. 4A and 4B are flowcharts showing flows of following processing and temporary origin setting processing executed by the voice interactive robot.

FIG. 4A is a flowchart illustrating following processing executed by the robot 100. In step S102, a determination is made as to whether or not the speaker following unit 103 or the face following unit 105 has detected (or is in the process of detecting) the user. In other words, a determination is made in step S102 as to whether or not the speaker following unit 103 can specify the direction of the speaker from voice input through the microphone 102, or whether or not the face following unit 105 can detect a face from an image captured by the camera 104 and specify the direction thereof.

When neither the speaker following unit 103 nor the face following unit 105 has detected the user (step S102: NO), the processing advances to step S108. In step S108, the movable part control unit 109 moves the head portion 20 to the initial position (in cases where the head portion 20 is not in the initial position). Next, in step S110, the temporary origin setting unit 106 cancels the temporary origin setting. In the processing for canceling the temporary origin setting, the temporary origin may be unset, or the temporary origin may be set at the origin position.

When at least one of the speaker following unit 103 and the face following unit 105 has detected the user (step S102: YES), the processing advances to step S104. In step S104, control is executed in accordance with an instruction from the speaker following unit 103 or the face following unit 105 to orient the head portion 20 in the direction of the user. Note that when both the speaker following unit 103 and the face following unit 105 detect the direction of the user, the detection result obtained by the face following unit 105 is prioritized. The reason for this is that the detection result obtained by the face following unit 105 is more precise.

In step S106, the temporary origin setting unit 106 sets a temporary origin on the basis of the orientation of the head portion 20. Temporary origin setting processing is shown in detail on a flowchart in FIG. 4B. The temporary origin setting processing S106 will now be described in detail with reference to FIG. 4B.

In step S202, the temporary origin setting unit 106 determines whether or not a predetermined operation is possible in a current face position. A movable range of the head portion 20 of the robot 100 is determined in advance. The predetermined operation is an envisaged operation that may be specified by the smartphone 110. The temporary origin setting unit 106 determines whether the head portion 20 will remain within the movable range or exceed the movable range when the head portion 20 performs the predetermined operation using the direction (position) in which the head portion 20 is currently oriented as a reference.

If the movement of the head portion 20 will remain within the movable range (S202: YES), the temporary origin setting unit 106 sets the current position of the head portion 20 (the motor position) as the temporary origin (S204). If the movement of the head portion 20 will exceed the movable range (S202: NO), on the other hand, the temporary origin setting unit 106 sets the temporary origin so that the movement range of the head portion 20 will remain within the movable range when the predetermined operation is performed using the temporary origin as a reference (S206).

This will now be described more specifically with reference to FIGS. 5 and 6. FIGS. 5 and 6 are views showing the robot 100 from above. Note that here, for the sake of simplicity, only a horizontal direction head-shaking operation (a rolling operation) will be considered, but a head portion movement for nodding the head vertically and a head portion movement combining vertical and horizontal movements are handled similarly.

Figure 5A:
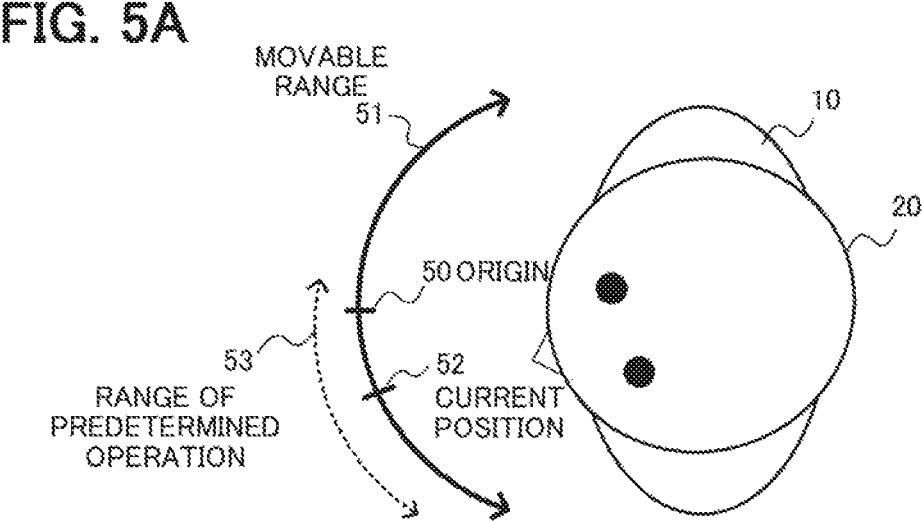
FIGS. 5A and 5B are views illustrating the temporary origin setting processing.

As shown in FIG. 5A, a movable range 51 is determined in advance for the head portion 20. In this example, the head portion 20 can move within a range of +45 degrees to −45 degrees relative to an origin 50 (the initial position). In the example shown in FIG. 5A, the orientation of the face (the head portion 20) has been rotated −10 degrees (10 degrees leftward) from the origin by the following processing. A current position 52 indicates the position of the head portion (the motor position) after the following processing. Here, the envisaged operation that may be specified by the smartphone 110 is assumed to be an operation (a head-shaking operation) for moving the head portion 20 within a range of ±20 degrees about a reference point. A range 53 shown in FIG. 5A denotes the movement range of the head portion when the predetermined operation is performed using the current position 52 of the head portion 20 as a reference.

Figure 5B:
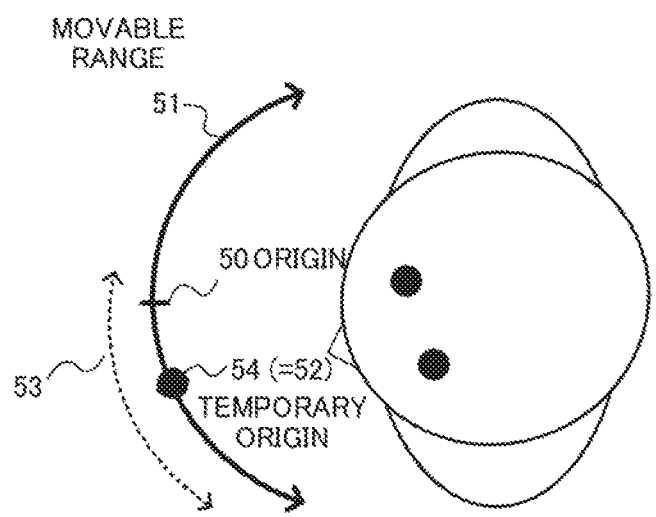

In this example, when a head-shaking operation of ±20 degrees (the predetermined operation) is performed using the current position 52 as a reference, the head portion moves within a range of −30 degrees to +10 degrees about the origin 50, and therefore the head portion 20 does not exceed the movable range (S202: YES). Accordingly, as shown in FIG. 5B, the temporary origin setting unit 106 sets the current position 52 of the head portion 20 as a temporary origin 54 (S204).

FIG. 6A is similar to FIG. 5A, but in FIG. 6A, the orientation of the face (the head portion 20) has been rotated −30 degrees (30 degrees leftward) from the origin by the following processing so that the head portion 20 is in a position indicated as a current position 52'. Here, when a head-shaking operation of ±20 degrees (the predetermined operation) is performed using the current position 52' as a reference, the head portion is moved within a range (denoted as a range 53') of −50 degrees to −10 degrees about the origin 50, and therefore the head portion 20 exceeds the movable range (S202: NO).

Hence, the temporary origin setting unit 106 determines the temporary origin so as to satisfy temporary origin conditions (S206).

(Condition 1) When the predetermined operation (for example, a head-shaking operation of ±20 degrees) is performed using the temporary origin as a reference, the movement range of the head portion 20 remains within the movable range.

(Condition 2) The temporary origin is set in the closest position to the current position of the head portion 20 in which condition 1 is satisfied.

In this example, as shown in FIG. 6B, a position of −25 degrees relative to the origin 50 is set as a temporary origin 54'. As a result, an operation range 53" of the head portion when performing a head-shaking operation of ±20 degrees using the temporary origin 54' as a reference remains within the movable range 51 of the head portion.

2. Processing upon Reception of Operation Instruction

Figure 7:
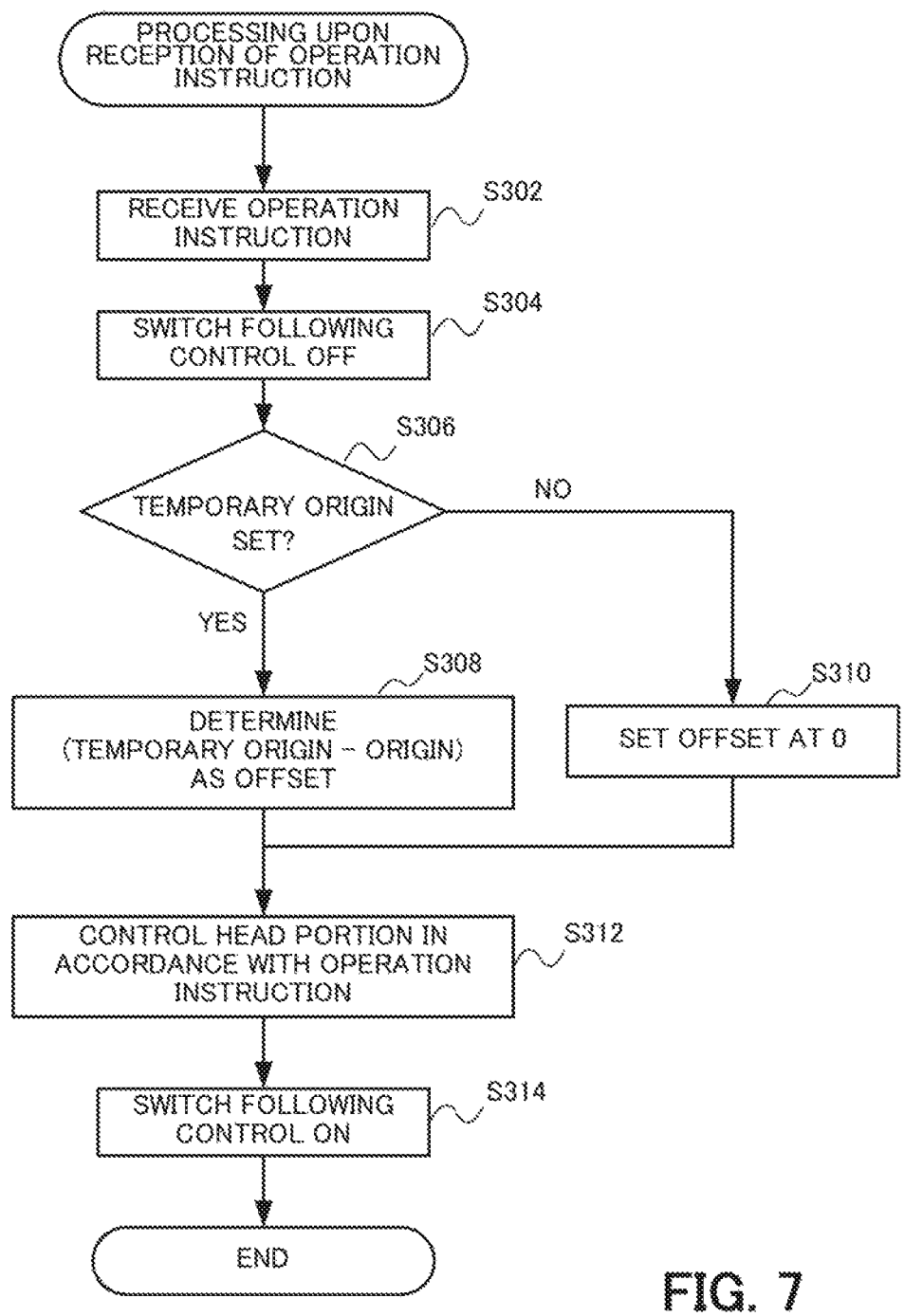
FIG. 7 is a flowchart showing a flow of movable part control processing executed upon reception of an operation instruction.

Next, referring to FIG. 7, processing executed when the robot 100 receives an operation instruction from the smartphone 110 will be described.

In step S302, the operation instruction reception unit 107 receives an operation instruction from the operation instruction transmission unit 111 of the smartphone 110. Next, in step S304, before executing control based on the operation instruction, the robot 100 switches the following processing functions of the speaker following unit 103 and the face following unit 105 OFF. This is to prevent a situation in which the following functions act while the head portion 20 is moved in accordance with the operation instruction such that the head portion 20 performs a different operation to that of the operation instruction.

In step S306, the operation instruction execution unit 108 determines whether or not the temporary origin has been set by the temporary origin setting unit 106. When the temporary origin has been set (S306: YES), the processing advances to step S308, where the operation instruction execution unit 108 determines the difference between the temporary origin and the origin, or in other words "temporary origin—origin", as the offset. The processing then advances to step S312. When the temporary origin has not been set (S306: NO), the offset is set at zero in step S310, whereupon the processing advances to step S312.

In step S312, the operation instruction execution unit 108 adds the offset to the movement amount specified by the operation instruction, and then issues a control instruction to the movable part control unit 109. Note that the movable part control unit 109 controls the head portion 20 using the origin as a reference, but since the difference between the temporary origin and the origin is added as the offset, as described above, the operation is performed using the temporary origin as a reference. For example, in the example shown in FIG. 5A, the operation is performed within the range denoted by the reference numeral 53 in FIG. 5B, and in the example shown in FIG. 6A, the operation is performed within the range denoted by the reference numeral 53" in FIG. 6B.

Advantageous Effects of this Embodiment

According to this embodiment, when the smartphone 110 instructs the movable part (the head portion) of the robot 100 to perform an operation, an appropriate operation can be performed in response to an operation instruction based on the origin (the initial position) even when the smartphone 110 has not ascertained the condition of the movable part of the robot 100. More specifically, when processing is executed to follow the user such that the orientation of the head portion 20 deviates from the initial position (the origin), an operation is performed using the temporary origin determined in accordance with the following operation as a reference rather than executing control based on the origin, and as a result, an appropriate operation is performed.

Further, rather than simply setting the position of the movable part (the head portion) after being moved in accordance with the following processing as the temporary origin, the temporary origin is set in consideration of the movable range of the movable part and an envisaged operation, and therefore, when an operation specified by the smartphone 110 is performed, the operation does not exceed the movable range. In this case, the performed operation is different to an operation based on the current position of the head portion, but the operation corresponds more closely to the instruction from the smartphone 110 than when an attempt is made to execute control exceeding the movable range.

Furthermore, in this embodiment, the temporary origin is set while maintaining the origin instead of replacing the origin, and therefore processing based on the origin can be executed even while the temporary origin is set. Moreover, the origin can be reset easily.

Modified Examples of First Embodiment

In the above description, a case in which only one envisaged operation that may be specified by the smartphone 110 is employed was described, but it is clear that the present invention may also be applied to a case in which a plurality of envisaged operations are employed. For example, similar processing to that described above may be executed using a range that includes all of the operation ranges of the plurality of envisaged operations. Alternatively, when a plurality of envisaged operations are employed, the temporary origin may be set for each envisaged operation. In this case, the robot 100, having received an operation instruction, may determine the envisaged operation to which the specified operation corresponds, and then use the corresponding temporary origin.

In the above description, only an operation performed about a single axis was described, but similar processing may be executed in relation to an operation performed about a plurality of axes. Moreover, the present invention is not limited to a rotary operation, and similar processing may be executed in relation to a linear operation.

In the above description, instructions to switch the speaker following function and face following function ON and OFF are issued explicitly in steps S304 and S314, but instead, the following functions may be switched OFF automatically while the movable part moves on the basis of an operation instruction. For example, the speaker following unit 103 and the face following unit 105 may be configured such that when the operation instruction execution unit 108 starts to operate the movable part in accordance with the operation instruction, the speaker following unit 103 and the face following unit 105 detect the start of the operation, whereupon the following functions are switched OFF. Further, the speaker following unit 103 and the face following unit 105 may be configured such that the following functions are switched ON when the movable part has not been operated in accordance with an operation instruction for at least a predetermined time (500 milliseconds, for example).

Furthermore, there is no need to execute all operation instructions from the smartphone 110 using the temporary origin as a reference. Instead, the operation instruction transmitted to the robot 100 from the smartphone 110 may include information (a flag, a message type, or the like) indicating whether the operation instruction is to be executed about the origin or about the temporary origin, and the robot 100 may switch the processing in accordance with this information.

Second Embodiment

This embodiment is configured basically identically to the first embodiment, and similar processing is executed therein. However, the timing of the temporary origin setting processing differs from the first embodiment. In the first embodiment, the temporary origin is set when the head portion 20 (the movable part) is moved by a following operation, whereas in this embodiment, the temporary origin is set after acquiring the operation instruction from the smartphone 110.

The following processing according to this embodiment is basically identical to that of the first embodiment (FIG. 4A), but differs therefrom in that the processing of steps S106 and S110 is not executed. Hence, detailed description thereof has been omitted.

Figure 4B:
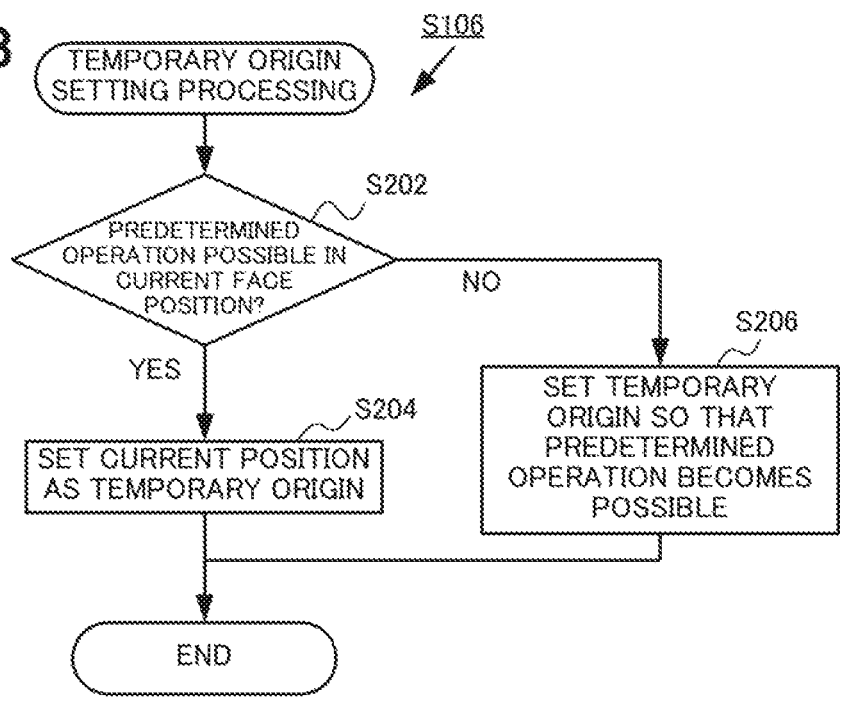
Figure 8:
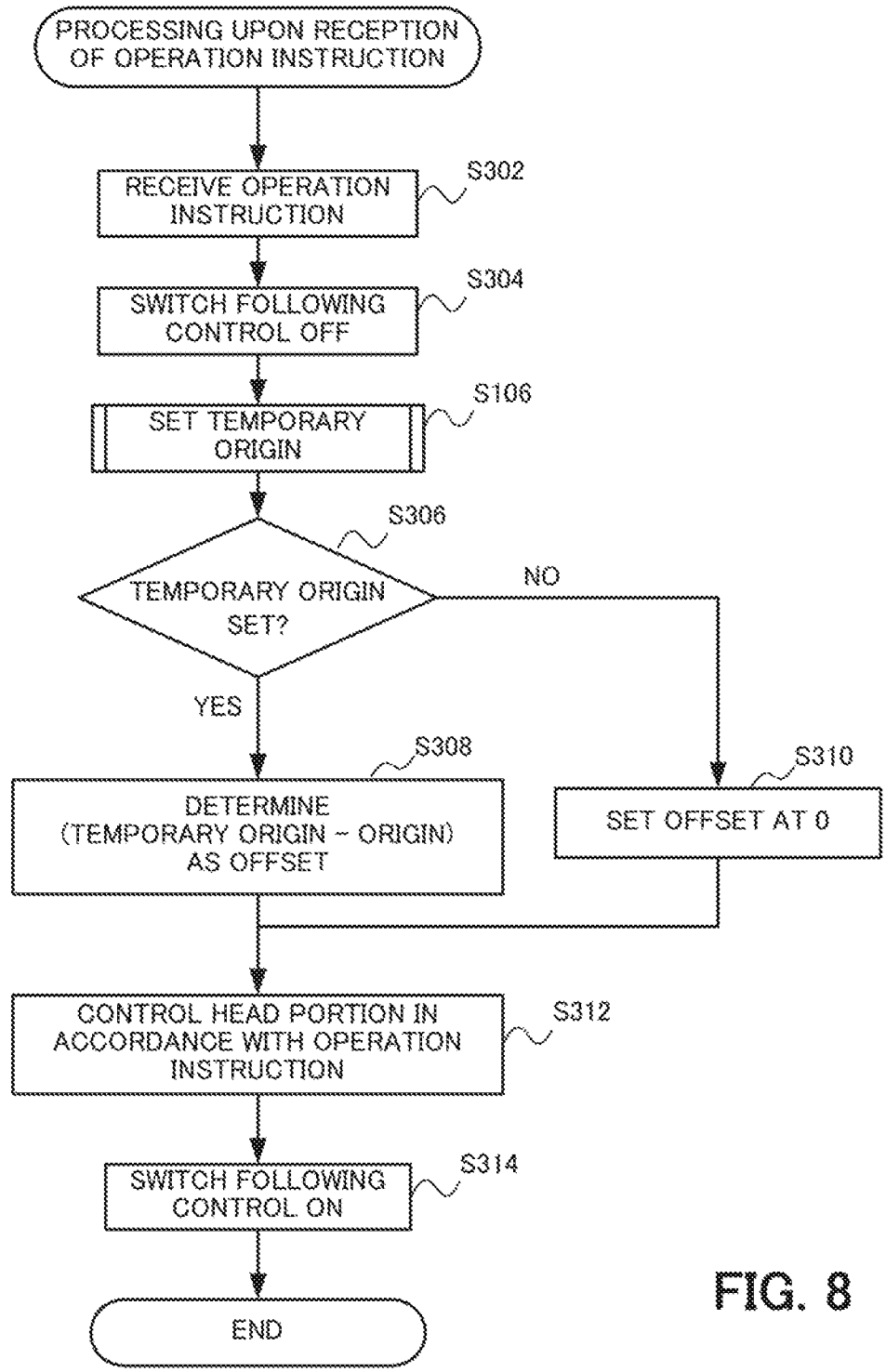
FIG. 8 is a flowchart showing the flow of the movable part control processing executed upon reception of an operation instruction.

FIG. 8 is a flowchart illustrating the processing executed upon reception of an operation instruction according to this embodiment. This processing differs from that of the first embodiment in that the temporary origin setting processing S106 is provided after the operation instruction is acquired and the following control is switched OFF (after steps S302 to S304). The temporary origin setting processing S106 itself is identical to that of the first embodiment, and is executed as shown in. FIG. 4B.

According to this embodiment, similar effects to the first embodiment can be obtained. In a case where a plurality of envisaged operations that may be specified by the smartphone 110 are employed, however, this embodiment is more advantageous than the first embodiment for the following reasons.

In contrast to the method of the first embodiment in which the temporary origin is set using the entire operation range of the plurality of operations, it is possible to suppress a situation in which an operation is performed about a different temporary origin to the current position even though the specified operation can be performed about the current position. As a result, the operation specified by the operation instruction can be executed more faithfully.

In contrast to the method of the first embodiment in which the temporary origin is set for each of the plurality of operations, in this embodiment there is no need to calculate and store a plurality of temporary origins.

Modified Examples

The configurations of the embodiments and modified examples described above may be employed in appropriate combinations within a scope that does not depart from the technical spirit of the present invention. Further, the present invention may be realized after applying appropriate modifications thereto within a scope that does not depart from the spirit thereof.

In the above description, the movable part that follows the user is the head portion, but the movable part does not necessarily have to be the head portion, and may be a hand, a foot, or another desired site. Moreover, the robot 100 does not have to be human-shaped, and there are no particular limitations on the shape thereof. For example, the robot 100 may resemble an animal or a machine.

The device that transmits instructions to the robot 100 does not have to be a smartphone, and any computer may be used. For example, a laptop type computer, a tablet type computer, or the like may be used instead.

The voice interaction system does not have to be constituted by a robot, a smartphone, a voice recognition server, an interaction server, and so on, as in the above embodiments, and the overall system configuration may be set as desired as long as the functions described above can be realized. For example, all of the functions may be executed by a single device. Alternatively, a function implemented by a single device in the above embodiments may be apportioned to and executed by a plurality of devices. Moreover, the respective functions do not have to be executed by the above devices. For example, a part of the processing executed by the smartphone may be executed in the robot.

In the above description, it is assumed that the smartphone 110 is not notified of an operation performed by the movable part of the robot 100 in response to the following processing. However, the smartphone 110 may be notified of the condition of the movable part resulting from the following processing. Likewise in this case, by employing the method of the present invention, the smartphone 110 can control the movable part of the robot 100 appropriately without taking into consideration the condition of the movable part.

What is claimed is:

1. A control method for a voice interactive robot including a main body and a movable part capable of moving relative to the main body, and interacting with a user by voice,
   the control method comprising:
   a following control step of moving the movable part so that the movable part follows the user;
   a temporary origin setting step of setting a temporary origin of the movable part in response to movement of the movable part in the following control step;
   an acquisition step of acquiring an operation instruction issued in relation to the movable part;
   an operation execution step of moving the movable part in accordance with the operation instruction using the temporary origin as a reference;
   wherein the following control step includes moving the movable part so that the movable part is oriented in a direction of the user,
   the temporary origin setting step includes setting a position, to which the movable part is moved, as the temporary origin, and when the movable part exceeds a movable range thereof when the movable part is caused to perform a predetermined operation using a current position thereof after being moved as a reference, setting the temporary origin such that the predetermined operation remains within the movable range.

2. A non-transitory computer-readable medium storing a program for causing a computer to execute the respective steps of the method according to claim 1.

3. A voice interactive robot interacting with a user by voice,
   the robot comprising:
   a main body;
   a movable part capable of moving relative to the main body; and
   a processor configured to
   move the movable part so that the movable part follows the user;

set a temporary origin of the movable part in response to movement of the movable part;

acquire an operation instruction issued in relation to the movable part; and move the movable part in accordance with the operation instruction using the temporary origin as a reference, wherein the processor is configured to move the movable part so that the movable part is oriented in a direction of the user, and set a position, to which the movable part is moved, as the temporary origin, and in a case where the movable part exceeds a movable range thereof when the movable part is caused to perform a predetermined operation using a current position thereof after being moved as a reference, the processor is configured to set the temporary origin such that the predetermined operation remains within the movable range.

4. The voice interactive robot according to claim 1, wherein the movable part is controlled by specifying a movement amount from an origin determined in advance, and the processor moves the movable part by specifying a movement amount obtained by adding a difference between the origin and the temporary origin to the movement amount specified by the operation instruction.

5. The voice interactive robot according to claim 4, wherein the processor sets the temporary origin after acquiring the operation instruction, sets a current position of the movable part after being moved by the processor as the temporary origin in a case where the movable part does not exceed a movable range thereof when an operation specified by the operation instruction is executed using the current position as a reference, and sets the temporary origin such that the operation specified by the operation instruction remains within the movable range of the movable part in a case where the movable part exceeds the movable range thereof when the specified operation is executed using the current position as a reference.

6. The voice interactive robot according to claim 1, wherein the processor does not perform a following operation while the processor moves the movable part on the basis of the operation instruction.

7. The voice interactive robot according to claim 1, wherein the processor moves the movable part so that the movable part is oriented in a user direction determined from an image captured by a camera or a user direction determined from a voice acquired from a microphone.

8. The voice interactive robot according to claim 1, wherein the processor acquires the operation instruction from a device that does not detect movement of the movable part by the processor.

9. A voice interactive system, comprising:

the voice interactive robot according to claim 1, and a controller that is connected to the voice interactive robot by wireless communication and that transmits the operation instruction to the voice interactive robot.

\* \* \* \* \*

UNITED STATES PATENT AND TRADEMARK OFFICE
CERTIFICATE OF CORRECTION

PATENT NO.        : 10,828,773 B2
APPLICATION NO.   : 15/958602
DATED             : November 10, 2020
INVENTOR(S)       : Hayato Sakamoto et al.

It is certified that error appears in the above-identified patent and that said Letters Patent is hereby corrected as shown below:

In the Claims

In Column 13, Line 19, in Claim 4, delete "according to claim 1," and insert -- according to claim 3, --, therefor.

In Column 14, Line 13, in Claim 6, delete "according to claim 1," and insert -- according to claim 3, --, therefor.

In Column 14, Line 17, in Claim 7, delete "according to claim 1," and insert -- according to claim 3, --, therefor.

In Column 14, Line 22, in Claim 8, delete "according to claim 1," and insert -- according to claim 3, --, therefor.

In Column 14, Line 27, in Claim 9, delete "according to claim 1," and insert -- according to claim 3, --, therefor.

Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*